United States Patent [19]

Ripert

[11] 4,431,022
[45] Feb. 14, 1984

[54] LINE REMOVABLE VALVE STRUCTURE WITH EXTENSIBLE SEAL RINGS ON VALVE CARTRIDGE

[75] Inventor: Robert L. Ripert, Concord, Calif.

[73] Assignee: Grove Valve and Regulator Company, Oakland, Calif.

[21] Appl. No.: 339,138

[22] Filed: Jan. 13, 1982

[51] Int. Cl.³ .................................. F16K 43/00
[52] U.S. Cl. .................. 137/315; 137/454.2; 251/152
[58] Field of Search .............. 137/315, 454.2; 251/148, 152

[56] References Cited

U.S. PATENT DOCUMENTS

| | | | |
|---|---|---|---|
| 1,822,961 | 9/1931 | Emery | 137/315 |
| 3,371,677 | 3/1968 | Connolly | 137/315 |
| 3,672,632 | 6/1972 | Chow | 137/454.2 |
| 4,079,746 | 3/1978 | Killian | 137/315 |
| 4,311,163 | 1/1982 | Langevin | 137/315 |

*Primary Examiner*—George L. Walton
*Attorney, Agent, or Firm*—Melvin R. Stidham

[57] ABSTRACT

A line-removable ball valve including a rigid framework or box with opposing, parallel, thick steel end plates. A valve cartridge with all components carried therein is received between the parallel plates and a seal carrier ring, carried on and sealed with an end closure of the cartridge, is biased outward to seal against the inner surface of each of the parallel plates to form a fluid-tight unitary structure. The biasing force acting against the seal carrier is relieved for removal of the valve cartridge from between the steel plates.

16 Claims, 8 Drawing Figures

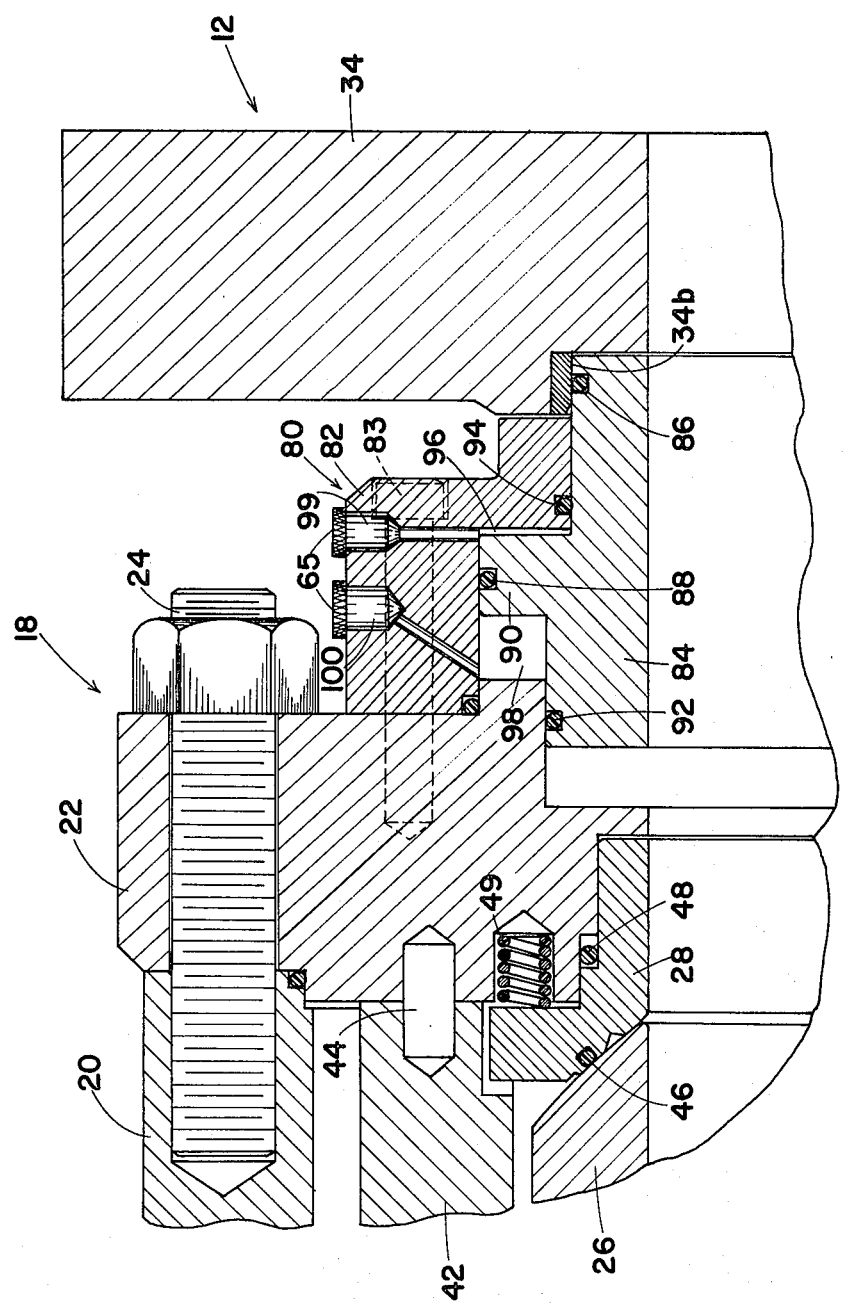

LINE REMOVABLE VALVE STRUCTURE WITH EXTENSIBLE SEAL RINGS ON VALVE CARTRIDGE

BACKGROUND OF THE INVENTION

Particularly in undersea pipeline installations, it is highly desirable to be able to remove a pipeline valve, or its internal components, for purposes of repairing and replacing same while continuing to support the pipeline during the removal and replacement operation.

Some have suggested the provision of top-entry valves wherein access to the valve internal components is gained by removal of a top closure. However, the repair of such valves requires a number of mechanical manipulations such as the removal and replacement of bolts, the main valve member and the seat ring assemblies, and such operations are not ideally performed on the ocean floor, where maneuverability and mechanical leverage are impaired and visibility is generally poor. Moreover, a part dropped in the silt and vegetation of the ocean floor may not be easily found.

There are commercially available valves of the expansible tube type, wherein a cartridge containing all of the operating parts of the valve is clamped between two line flanges which, in turn, are interconnected by threaded studs. In order to remove the cartridge from between the line flanges, the studs across the top are removed and the nuts on the remaining studs are loosened. Jacking nuts are provided on at least some of the remaining studs on the inboard side of the flanges so that they can be threaded outward to jack the line flanges apart for removal of the valve cartridge. However, in undersea operations, the seas, tides and shifting sands impose many additional forces on the pipeline which, with the removal of studs between the line flanges could impose severe stresses on the remaining studs and prevent proper realignment when the valve cartridge is replaced. Moreover, the studs and nuts removed from the valve for purposes of valve cartridge replacement, are easily lost in the silt, sands and vegetation on the ocean floor where visibility is something less than ideal.

OBJECTS OF THE INVENTION

It is an object of this invention to provide a pipeline valve, the principal components of which may be removed from the line while other members continue to support and maintain the integrity of the pipeline.

It is a further object of this invention to provide a removable ball valve for undersea service which can be removed and replaced in a minimum amount of time with a mimimum number of tools.

It is a further object of this invention to provide an undersea pipeline valve wherein a valve cartridge can be removed without requiring removal of nuts, bolts or the like.

It is a further object of this invention to provide an undersea pipeline valve which can be removed from the line within the limits of operating leverage imposed on the diver under low gravity conditions.

Other objects and advantages of this invention will become apparent from the description to follow, particularly when read in conjunction with the accompanying drawings.

SUMMARY OF THE INVENTION

The valve cartridge comprises a cylindrical body band containing the main valve closure and seal rings, and end closures with flow passageways therethrough. The cartridge is received in a pipeline support box comprising two parallel, opposing thick steel end plates with complementary flow passages aligned with those in the valve cartridge, and side and bottom plates, all welded together to form a rigid, unitary structure. The end plates carry hubs or other means to install the support box or enclosure in a pipeline. When the valve cartridge is placed in the enclosure, seal ring carriers in the end closures of the valve cartridge are extended axially to seal against the thick end plates of the enclosure. In order to remove the valve cartridge from the enclosure, the seal ring carriers are retracted.

BRIEF DESCRIPTION OF THE DRAWINGS

In the drawings:

FIG. 4 is an enlarged partial section view of the valve cartridge of FIG. 3 as sealed in the pipeline support box;

DESCRIPTION OF PREFERRED EMBODIMENTS

Figure 1:
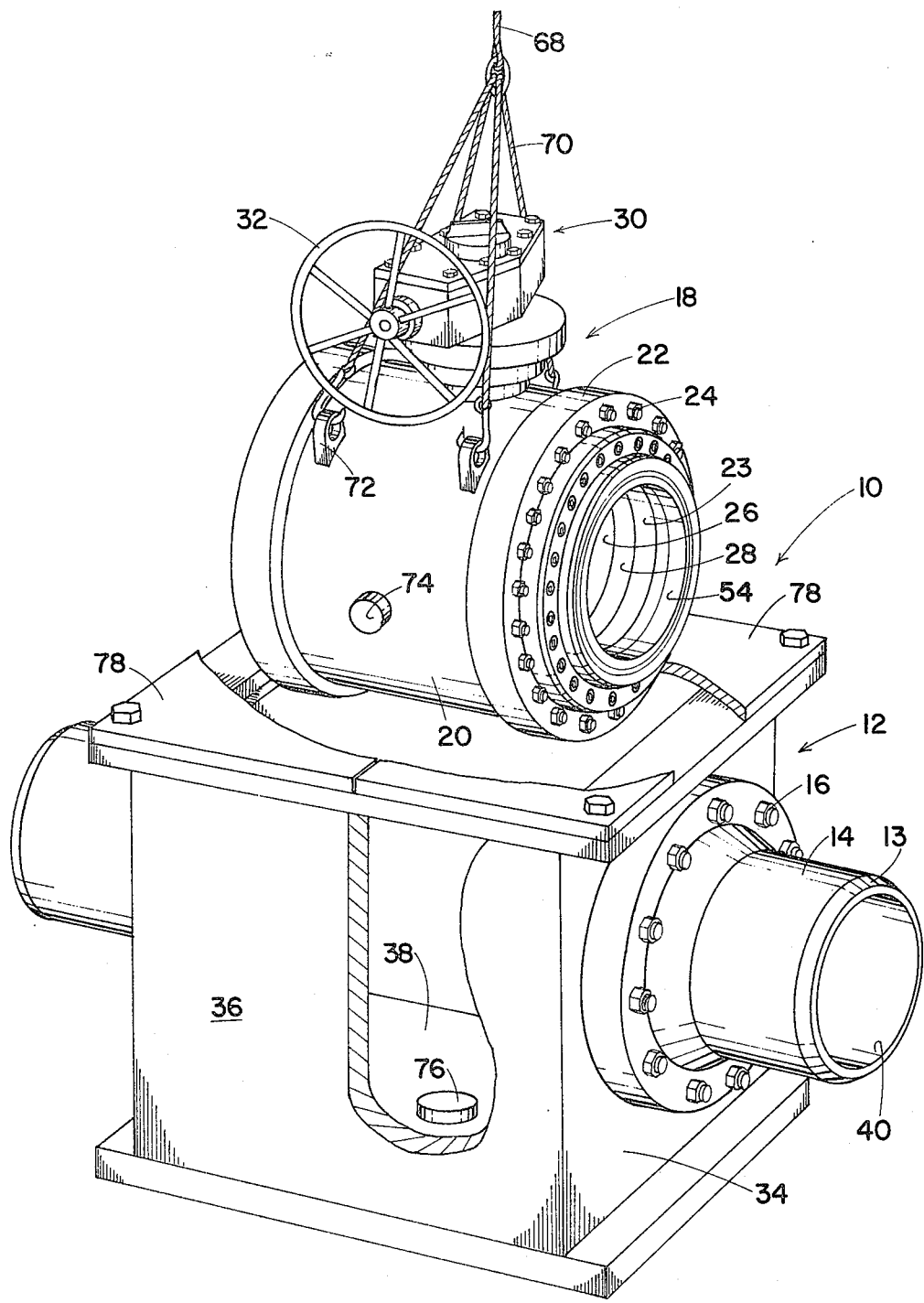
FIG. 1 is a view in perspective showing the pipeline support box with the valve cartridge removed and suspended above it.

Referring now to the FIG. 1 with greater particularity, the undersea line-removable pipeline valve assembly 10 of this invention includes a pipeline support box 12, which is permanently secured to the underwater pipeline (not shown) as by welding around the ends 13 of cylindrical hubs 14, which are secured to the pipeline support box by means of bolts 16. Received in the pipeline support box 12 is the valve module or cartridge 18, which includes a valve body band 20, and thick steel plate end closures 22 with flow passageways 23 therethrough, secured to the body band by studs 24. Also included in the valve cartridge 18 is the main valve closure member 26 such as a rotatable ball or plug and a suitable seat ring assembly 28 for sealing between the valve body 20 and the valve closure member 26. Any suitable valve operating means 30, including a hand wheel 32, may be mounted on the valve for opening and closing.

The pipeline support box 12 comprises a pair of parallel, thick steel end plates 34 to which are welded side and bottom plates 36 and 38 to form a unitary, rigid structure which will support the pipeline and maintain the end plates 34 and hubs 14 in axial alignment. Complementary flow passages 40 are provided in the thick end plates 34 for axial alignment with those 23 in the valve cartridge end plates 22.

Figure 2:
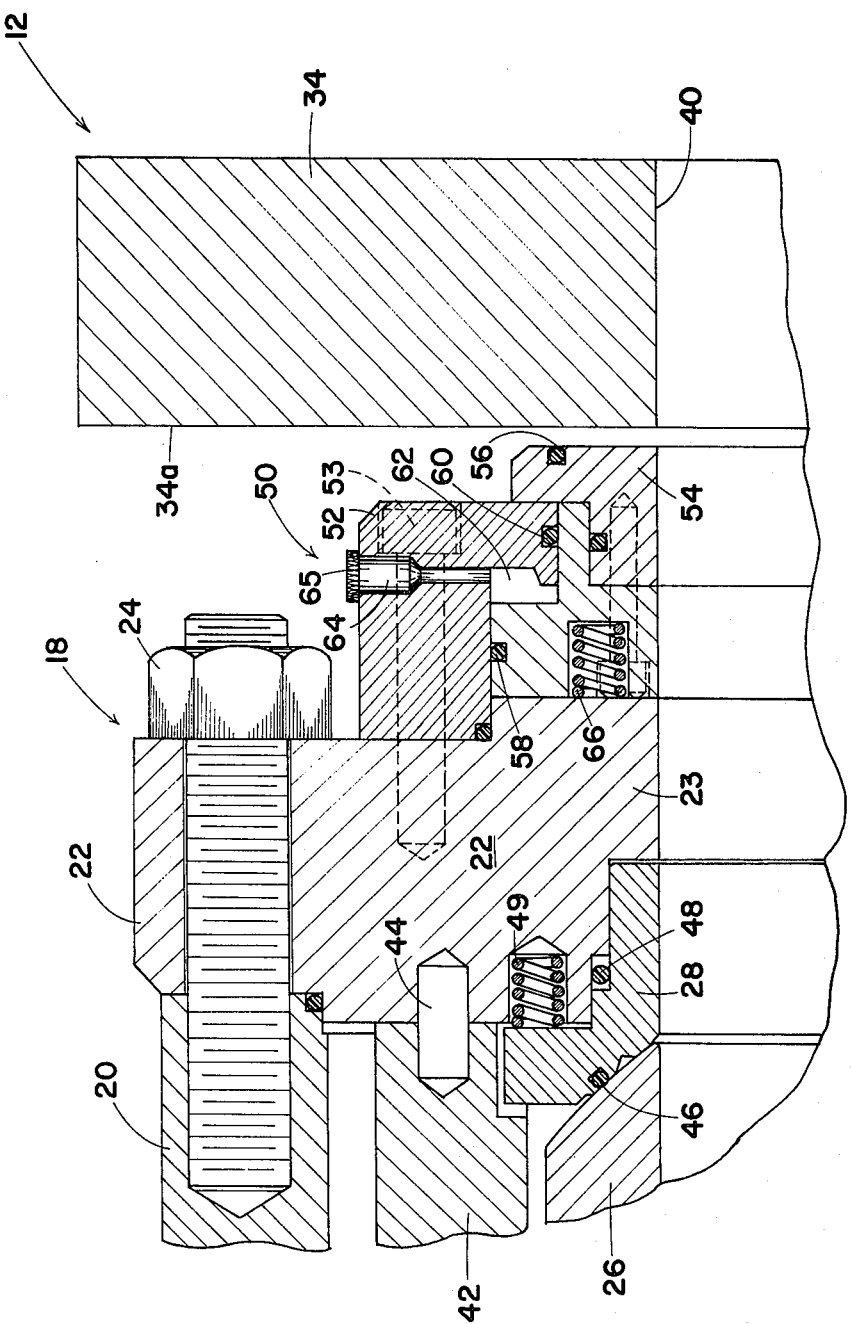
FIG. 2 is an enlarged partial section view of a valve cartridge embodiment.

The Embodiment of FIG. 2

Here, a portion of the valve cartridge 18 is shown in enlarged detail, including the valve ball 26 which is rotatable in a bearing block 42 clamped between the thick end plates 22 after positioning by alignment pins 44. The seat ring assembly 28 includes a main seal 46 for sealing against the ball and a tail O-ring 48 for sealing against the body end plates 22. The seat rings 28 are biased toward the ball by means of springs 49.

Carried on one or both ends 22 of the valve cartridge 18, is a box seal assembly 50, including a seat retainer 52 which is bolted at 53 to each of the end plates 22. Slidably carried in the seat retainer 52 is a box seal seat ring 54 carrying a main seal, such as an O-ring 56, to seal against the face 34a of the thick box end plate 34.

A pair of O-rings 58 and 60 form a sealed chamber 62 between the retainer ring 52 and seat ring 54, so that if a hydraulic fluid is introduced under pressure at 64 the seat ring 54 will retract to the position shown in 52 against the springs 66. This separates the seat ring 54 from the end plate face 34a, and enables installation and removal of the valve cartridge 18. Hence, the hydraulic fluid may be introduced at 64 at the surface, and then the cartridge is lowered, as by means of a cable 68 (FIG. 1) down into the pipeline support box 12 between the thick end plates 34. The cable 68 supports a sling 70, which is attached to lifting lugs 72 welded to the valve body 20. When the valve body 20 is so positioned, as determined by complementary positioning buttons 74 and 76 located on the bottom wall 38 and side walls 36 of the pipeline support box 12, the diver can simply remove the cap 65 and evacuate the hydraulic fluid from the chamber 62, to enable the springs 66 to extend the seat ring 54 out into engagement with the thick end plates 34. Once in place, the line pressure in the flow passages 23 and 24 act out over the full area of the seat ring 54 out to the outer diameter of the O-ring 58, being opposed only by the same pressure acting out as far as the main seal 56. The net effect is a spring-biased seal, which is augmented by line pressure acting on the differential area between the seal rings 56 and 58 to form a firm seal with the end plates 34 and maintain a leak proof structure. If desired, cover plates 78 (FIG. 1) may be placed on the pipeline support box 12 to minimize sedimentation entry into the box 12.

Figure 3:
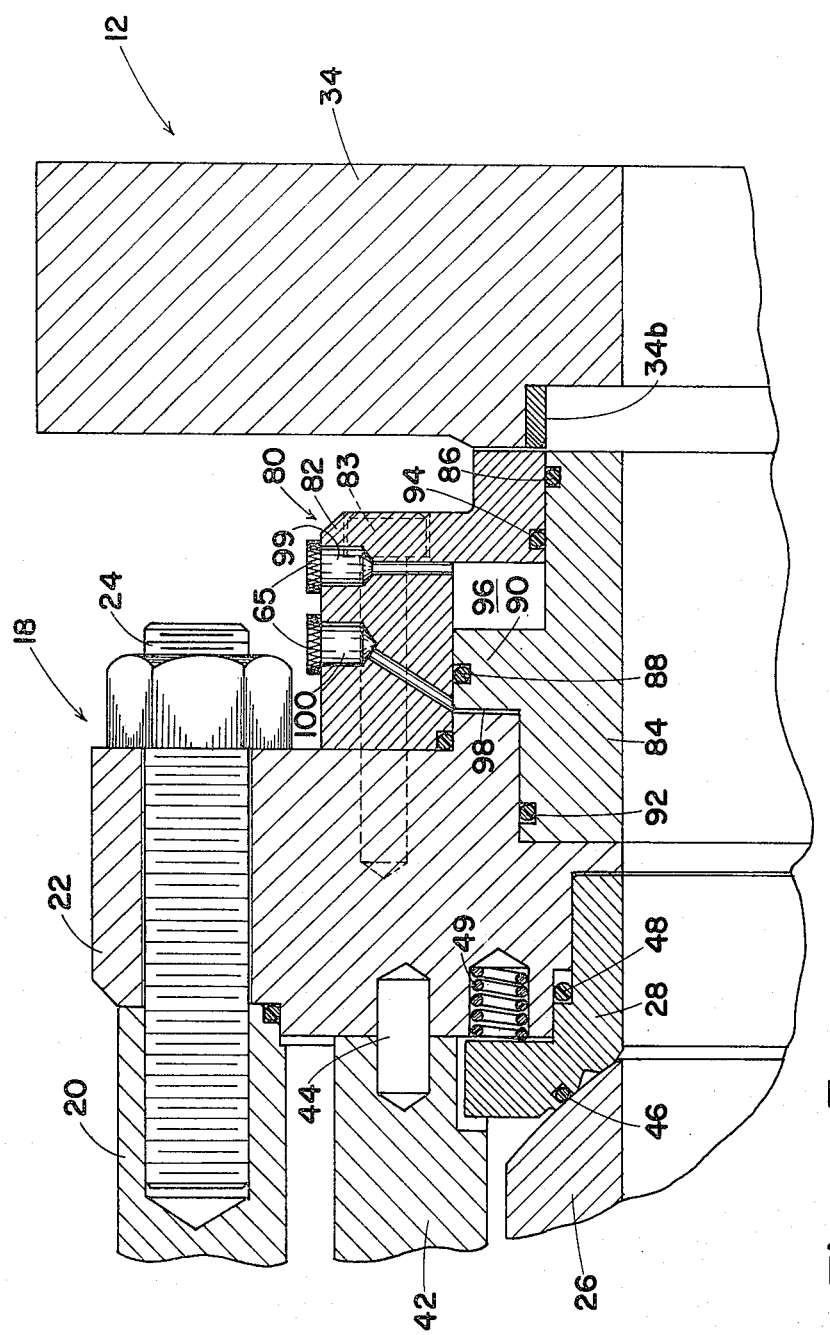
FIG. 3 is an enlarged partial section view of another valve cartridge embodiment, prior to activating the seal means.

The Embodiment of FIGS. 3 and 4

Here, the box seal assembly 80 includes a retainer ring 82 which is bolted at 83 to the valve cartridge end plate 22. The retainer ring 82 slidably receives the pipeline support box seat ring 84. The seat ring 84 has a nose seal 86, which is received in a cylindrical counter bore 34b in the end plate 34. With this O-ring type of radial seal, no pressure is required, as by means of springs or otherwise, to effect an initial seal.

An O-ring 88 is carried on the outer diameter of a flange or shoulder 90 integral with the seat ring 84, to seal against the retainer ring 82. Trailing and leading O-rings 92 and 94 form, with the retainer ring 82, leading and trailing fluid-tight chambers 96 and 98, into which a hydraulic fluid may be introduced as by means of ports 99 and 100 respectively.

In operation, the seat ring 84 may be retracted to the position shown in FIG. 3 as by pressurizing the forward chamber 96 to enable the valve cartridge 18 to be lowered between the end plates 34 of the pipeline support box 12. Then, with the cartridge in place as determined by suitable centering means, such as the buttons 74 and 76 shown in FIG. 1, the port 99 may be opened and the port 100 pressurized to expand the chamber 98 and evacuate the chamber 96, thus extending the seat ring 84 to the position shown in FIG. 4, wherein a seal is effected. Again, as in the first embodiment, line pressure acting over the differential area between the sealing diameters of tail seal ring 92 and forward main seal 86, also biases the seat ring 84 into its extended position.

Figure 6:
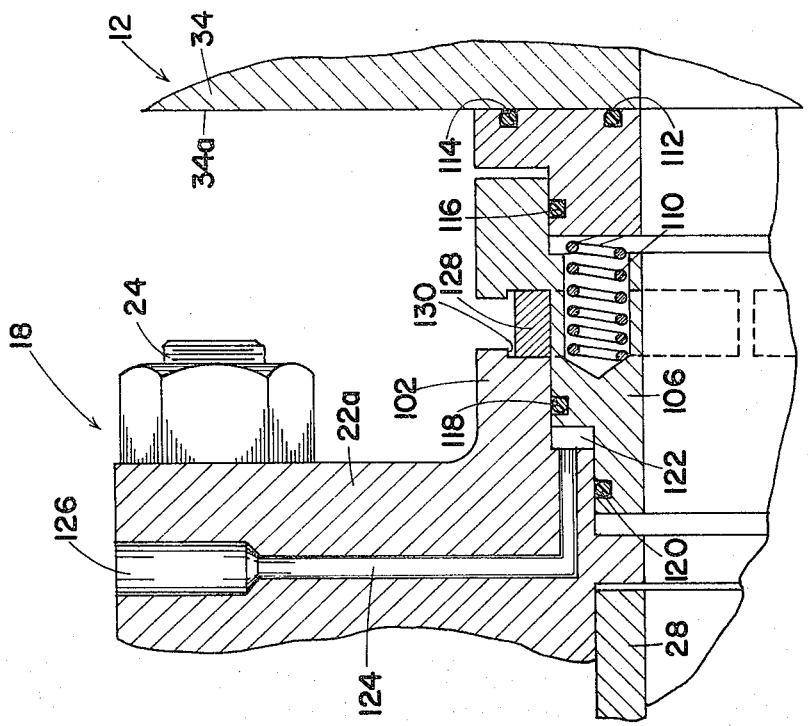
FIG. 6 is an enlarged partial section view of the cartridge of FIG. 5 in sealing condition.
Figure 5:
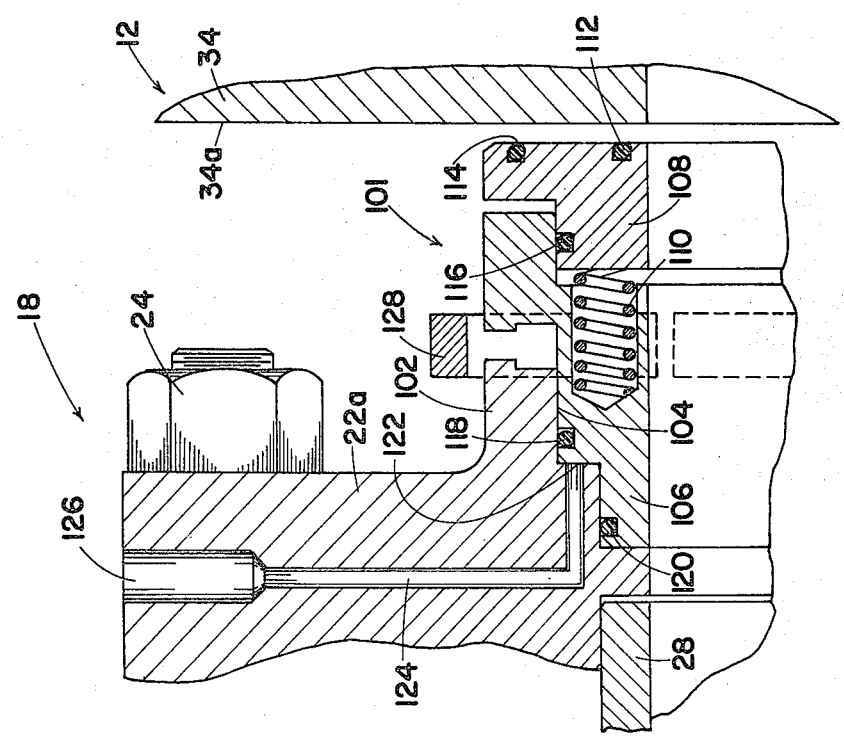
FIG. 5 is an enlarged partial section view of the valve cartridge showing another seal embodiment.

The Embodiments of FIGS. 5 and 6

Here, the end closure 22a of the valve cartridge 18 is formed to itself slidably receive the box seat ring assembly 101. Specifically, an annular boss 102 formed on each end closure 22 is counter bored at 104 to receive a main seat ring carrier 106 carrying a sub-ring 108, which is biased forward by means of springs 110 around its circumference. Inner and outer O-ring seals 112 and 114 are adapted to seal against the inner face 34a of the end plate 34 and a tail O-ring 116 prevents a leak path around the sub-ring 108. O-ring seals 118 and 120 on the main seat ring 106 form a sealed chamber 122, opening from a duct 124 wherein a hydraulic fluid may be introduced at 126.

When the main seat ring 106 is retracted to the position shown in FIG. 5, the springs 110 are ineffective to extend the sub-ring 108 out into engagement with the surface 34a. Hence, in this condition, the valve cartridge 18 may be lowered into or raised from the pipeline support box 12. However, with the fluid chamber 122 pressurized and expanded, the seat ring 106 is extended to the position shown in FIG. 6, and the sub-ring makes firm contact with the surface 34a, with the springs 110 compressed to maintain firm sealing contact therewith. This extension can be maintained by inserting a two-piece spacer ring 128 between the boss 102 and the carrier ring 106, which spacer ring is retained by shoulders 130 when the hydraulic chamber 122 is again depressurized.

Line pressure in the flow passageways will supplement the spring forces by acting over the area on the sub-ring between the sealing diameters of the tail O-ring 116 and the main O-ring 112. In addition, the pressure of sea water will also augment this by acting over the differential area between the sealing diameter of ring 116 and the sea water main seal 114.

When it is desired to remove the valve cartridge 18 from the pipeline support box, the chamber 122 is again pressurized to extend the main seat ring 106 away from the stationary boss 102 enough to remove the two-piece spacer ring 128 so that when the chamber 122 is again evacuated, the seat ring 106 can retract fully to the position shown in FIG. 5.

Figure 7:
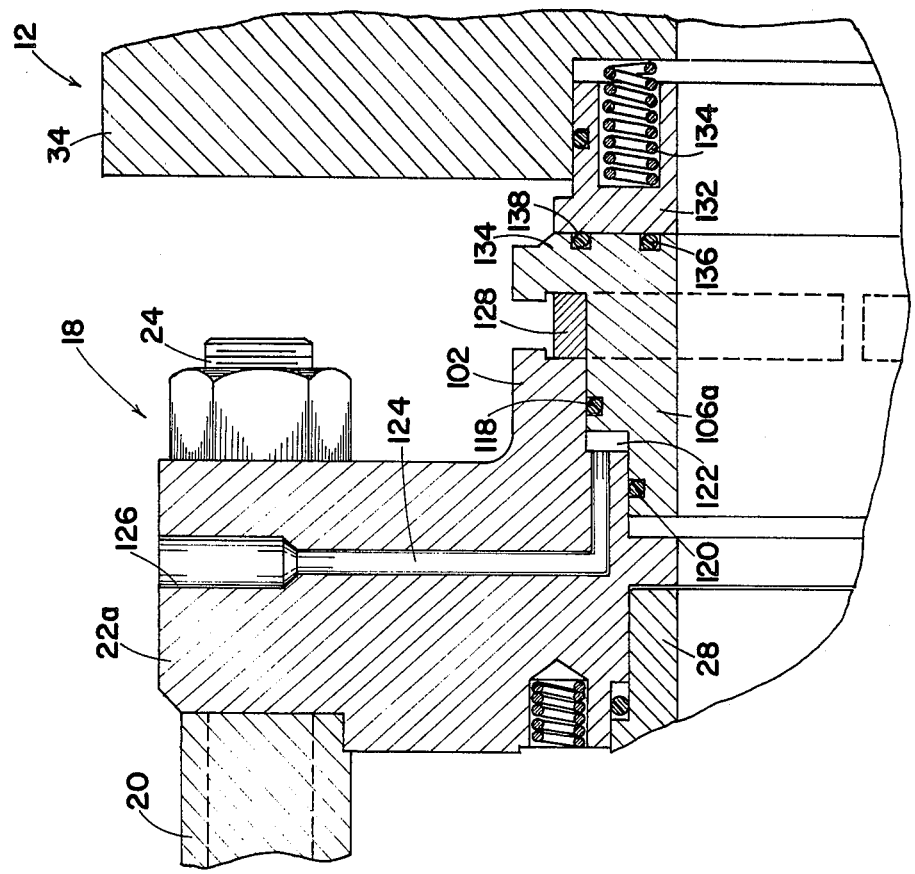
FIG. 7 is an enlarged partial section view of the valve cartridge and box showing an alternate form of seal.

The Embodiment of FIG. 7

This embodiment differs from that of FIGS. 5 and 6 in that the main seat ring 106a seals against a sub-ring 132 which is carried on the pipeline support box 12. With the seat ring 106a retracted, the springs 134 around the sub-seat ring 132 are ineffective to contact the leading face 134 of the main seat ring 106a, which carries inner and outer O-ring seals 136 and 138. However, with the main seat ring 106 extended as previously described, and held in place by a two-piece ring 128, as shown in FIG. 7, sealing contact is maintained and the springs 134 are held under compression.

Figure 8:
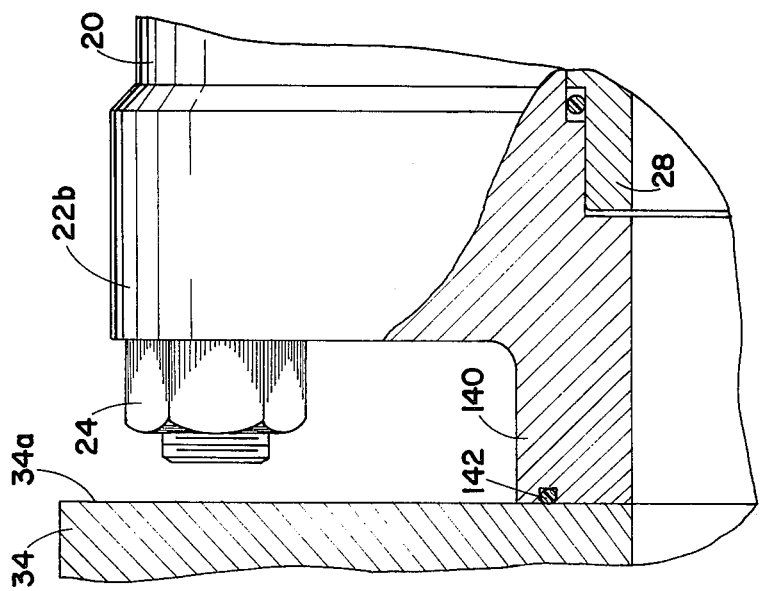
FIG. 8 is an enlarged partial section view of the valve cartridge showing an alternate form of seal for one side of the valve cartridge.

The Embodiment of FIG. 8

This embodiment differs from the other only in that one of the valve cartridge end plates 22b may be provided with a boss 140 carrying a passive seal ring 142 in its outer surface to seal against the inner surface 34a of one of the box pipeline support end plates 34. It is to be understood that this seal, is to be used in conjunction with an active, extensible seal of the types previously described in connection with FIGS. 1 to 7. Preferably, the valve cartridge is made symmetrical with extensible seals at both ends, but the embodiment of FIG. 8 is proposed as an alternative.

While this invention has been described in conjunction with preferred embodiments thereof, it is obvious that further modifications and changes therein may be made by those skilled in the art to which it pertains, without departing from the spirit and scope of this invention as defined by the claims appended hereto.

What is claimed as invention is:

1. A line-removable valve structure comprising:
   a pair of opposing, parallel plates with flow passageways therethrough;
   means on said plates around said flow passageways for connection of said plates in a pipeline;
   rigid framework members interconnecting said plates along the sides thereof;
   a valve cartridge with generally planar end walls and containing a movable valve closure member and seal rings, received between said parallel plates;
   a seal carrier ring axially movable on one of said end walls;
   a main seal ring carried at the front of said seal carrier ring for sealing against one of said parallel plates around the flow passageway;
   a tail seal ring carried around said seal carrier ring to seal between said end wall and said carrier ring throughout movement thereof; and
   force-applying means for biasing said seal carrier ring axially outward and into engagement with one of said parallel plates; and means for relieving said force-applying means to enable removal of said valve cartridge from between said parallel plates.

2. The valve structure defined by claim 1 wherein:
   said force-applying means includes:
   spring means on and around said one end wall biasing said seal carrier ring toward said one parallel plate.

3. The valve structure defined by claim 1 including:
   an annular carrier for said seal carrier ring slidably carried on said one end wall between an extended position wherein said spring means are compressed between said seal carrier ring and said annular carrier, and a retracted position wherein said spring means are relaxed.

4. The valve structure defined by claim 3 including:
   means for holding said annular carrier in said extended position.

5. The valve structure defined by claim 4 wherein said last-named means comprises:
   a fluid-tight chamber between said annular carrier and portions on said one end wall; and
   duct means in said one end wall for introduction of a pressurized fluid into said chamber.

6. The valve structure defined by claim 3 or 5 including:
   a rigid member interposed between said annular carrier and said one end wall to prevent retractive movement of said annular carrier.

7. The valve structure defined by claim 3 wherein:
   said tail seal ring seals on a larger diameter than said main seal so that line pressure acting against said seal carrier ring has a net force biasing it against said one parallel plate and including:
   a water seal ring on said seal carrier ring sealing against said one parallel plate on a diameter larger than said tail seal ring sealing diameter so that the pressure of sea water acts over a larger area at the back of said seal carrier ring than at the front.

8. The valve structure defined by claim 1 wherein:
   said force-applying means includes:
   a fluid-tight chamber between said seal ring and portions on said one end wall; and
   means for introducing a pressurized fluid into said fluid-tight chamber.

9. The valve structure defined by claim 8 including:
   a second fluid chamber between said seal ring and portions on said one end wall outward of fluid-tight chamber; and
   second duct means for introduction of pressurized fluid into said second fluid chamber to force retraction of said seal carrier ring.

10. The valve structure defined by claim 1 wherein:
    said tail seal ring seals on a larger diameter than said main seal so that line pressure acting against said seal carrier ring has a net force biasing it against said one parallel plate.

11. The valve structure defined by claim 1 including:
    a counterbore on the inboard side of said one parallel plate around the flow passageway therethrough;
    the leading portion of said seal carrier ring being cylindrical and of a diameter to fit slidably into said counterbore;
    said main seal ring being carried around said leading portion.

12. A line-removable valve strucure comprising:
    a pipe-supporting enclosure; and
    a valve cartridge including end closures with flow openings therein, and containing a movable valve closure member and seal means for sealing between said moveable closure member and said cartridge;
    said enclosure comprising:
    a pair of opposing, parallel plates with flow passageways therethrough;
    means on the outboard sides of said plates around said flow passageways for connection of said plate in a pipeline;
    rigid steel side members welded between and interconnecting said parallel plates;
    said structure including:
    a seal carrier ring slidably carried on an end closure of said cartridge around a flow opening;
    means sealing between said seal carrier and said end closure;
    means on the outer end of said seal carrier for sealing engagement with a parallel plate around the flow passageway therethrough;
    means biasing said seal carrier outward; and
    force delivering means for retracting said seal carrier to enable removal and placement of said cartridge between said parallel plates.

13. The line-removable valve structure defined by claim 12 including:
    first and second fluid-tight chambers formed between said end closure and said seal carrier, which when pressurized extend and retract said seal carrier, respectively; and first and second duct means in said end closure opening into said first and second chambers, respectively, for selectively introducing pressure fluid into one of said chambers and opening the other of said chambers to the exterior of said end closure.

14. The line-removable valve structure defined by claim 12 including:

a rigid steel bottom plate welded between and interconnecting said parallel plates; said side members, bottom plate and parallel plates forming a rigid housing to support a pipeline and to contain said cartridges.

15. The line-removable valve structure defined by claim 14 including:

a cover releasably secured to said housing.

16. The line-removable valve structure defined by claim 14 including:

hub members secured on the outboard sides of said parallel plates.

* * * * *